Dec. 14, 1948.  J. M. ROPER ET AL  2,455,951
INSTRUMENT LIGHTING
Filed Feb. 23, 1944
Fig. 1.
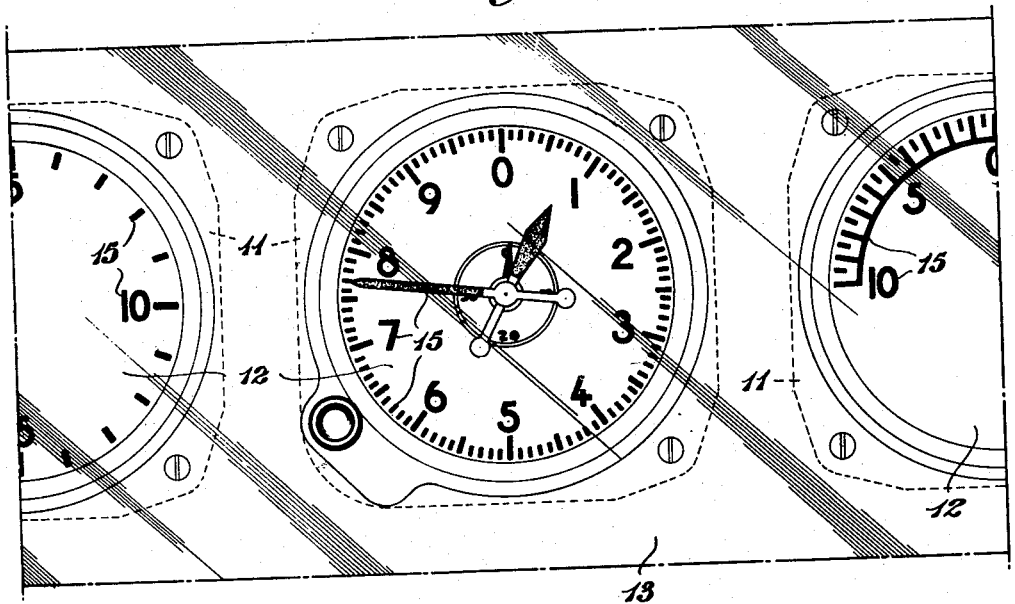
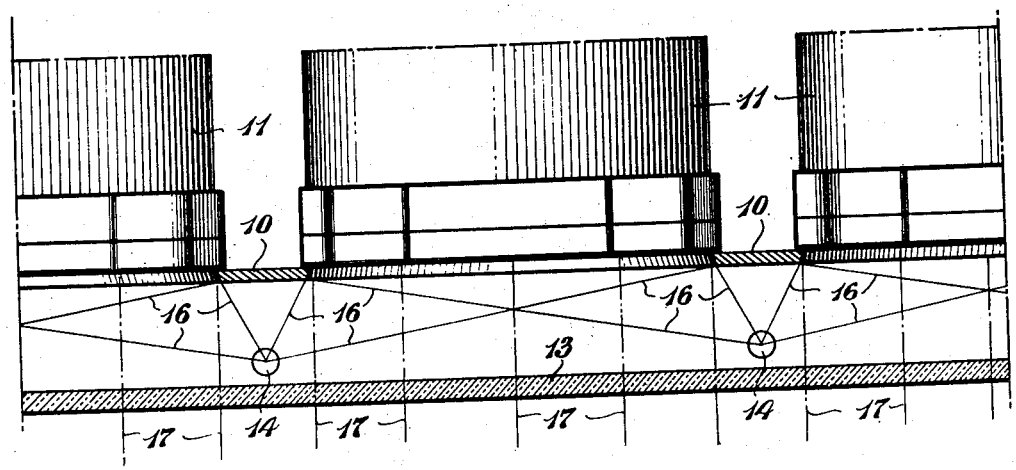
Fig. 2.
Inventors
John M. Roper and
Maurice K. Laufer.
By W. Glenn Jones
Attorney Patented Dec. 14, 1948

2,455,951

UNITED STATES PATENT OFFICE 2,455,951

INSTRUMENT LIGHTING

John M. Roper, Washington, D. C., and Maurice K. Laufer, Chevy Chase, Md.

Application February 23, 1944, Serial No. 523,554

4 Claims. (Cl. 240—2.1)

(Granted under the act of March 3, 1883, as amended April 30, 1928; 370 O. G. 757)

This invention relates to instrument lighting and has for an object to provide an improved form of instrument lighting especially adapted for lighting instrument boards on all types of vehicles, including ships, land vehicles and particularly aircraft.

The ordinary type of instrument lighting is unsatisfactory, particularly on aircraft, but likewise on all types of vehicles instrument boards, for many reasons. One defect of ordinary instrument lighting is the tendency of the glare from the instruments to blind the operator or pilot of the vehicle. The ability of the operator or pilot to see beyond his vehicle is impaired by the amount of light the pupils of his eyes are exposed to within the vehicle, even though his eyes are no longer directed to the light within the vehicle, or even though the light in the vehicle has been extinguished for some time. In land vehicles, this is not so important, for usually the outside lighting is fairly good, but even so, in the modern automobile, provision is usually made for dimming and extinguishing the instrument lights to prevent interference with outside vision. In aircraft, however, instrument visibility is essential for the safe operation of the aircraft, while at the same time the outside lighting is usually fairly poor. Hence it is essential that all possible interference with outside vision be eliminated as much as possible, yet it is essential that it be possible for the pilot to observe his instrument markings while at the same time he should be able to immediately transfer his vision to outside the aircraft without any impairment of his outside vision. Ultra-violet lighting of the instruments has been tried and found to be a partial but not a complete solution of this problem, and it is evident that the final solution has not yet been fully obtained in red lighting.

As is well known, due to persistence of vision, it takes about 30 minutes of complete darkness before a person's dark vision, that is, his ability to see in the dark, reaches about its maximum, and any ordinary lighting of instrument boards makes such desirable maximum "dark vision" impossible. The instrument lighting of this invention, however, is found to be a solution of this problem, and it is a further object of this invention to provide instrument lighting that will not interfere with the desired level of "dark vision" ability of the pilot.

A further object of this invention is to provide an instrument lighting means wherein the instrument markings alone are made visible to the operator, and wherein no direct or reflected light from the instrument faces or board will reach the eye of the observer.

Yet a further object of this invention is to provide an instrument lighting means wherein the light that does reach the eyes of the observer from the instrument markings is in the series of wave lengths that is non-glaring or non-blinding, and does not appreciably affect his dark vision.

A still further object of this invention is to confine the inside vision of the observer, i. e., the vision of the observer directed inside the vehicle to lighting of the instrument markings only.

A still further object of this invention is to an instrument lighting means wherein a screen is provided which screens out substantially all radiations produced by a source of radiations but will pass only such of the radiations emitted by a material activated by the source of radiations, as are outside of the range of radiations from the source of radiations.

With the foregoing and other objects in view as will hereinafter become apparent, this invention comprises the construction, combination and arrangement of parts hereinafter set forth, claimed and illustrated in the accompanying drawing, wherein:

Fig. 1 is a fragmentary plan view of an instrument board to which this invention has been applied, and Fig. 2 is a partly sectional and partly diagrammatic view at right angles to the bottom edge of Fig. 1.

There is shown at 10 a conventional instrument board of a vehicle, such as an aircraft or other type of vehicle, through which a number of vehicle instruments 11 are conventionally mounted. Mounted in front of the faces 12 of the instruments 11 is a red colored cover glass or panel 13. Mounted between the red colored panel 13 and the instrument board 10 and instrument faces 11 are blue lamps or light sources 14.

The instrument faces 12 are provided with pointers and indicia which are covered with fluorescent instrument markings 15 of the orange yellow type recently standardized by the Army and Navy of the United States. These instrument markings 15 include both the pointers and the indicia. The source 14 of activating radiation 16 is such, or is so filtered by the glass bulb of the lamp 14 or otherwise, that the wave length interval thereof is different from the wave length interval of the light 17 which is emitted by the activated fluorescent material of the instrument markings 15. The panel 13 is such that it transmits light of approximately the same wave length interval as the light 17 emitted by the activated fluorescent material of the instrument markings 15. This panel 13, it will be observed, is located between the fluorescent markings 15 and the eyes of the vehicle operator or pilot, while the source 14 of activating radiation 16 is located on the opposite side of the panel 13 from the eyes of the pilot. The panel 13 is such as to transmit none, or at most only a negligible amount of the activating radiation 16, yet its transmission for white light is sufficiently great that the instrument markings 15 are distinctly visible by reflected light during daytime without artificial light.

The principles of operation are as follows. The orange yellow fluorescent markings 15 are activated by the blue light radiations 16, whose longest wave length is 500 millimicrons, from the source 14, and the panel 13 is of a colored plastic which screens out and does not transmit light of a wave length less than 560 millimicrons. As a result, no direct or reflected light or radiation 16 from the source 14 penetrates through the panel 13, and only that light is transmitted that has been activated by the markings 15, while all other light, such as that reflected by the instrument board and the instrument faces outside of the activated markings is screened out. The amount and quality of light thus transmitted has been found to be such that it causes but little interference with "dark vision," that is, it causes less effect on dark vision than light composed of wave lengths shorter than that emitted by the activated fluorescent material. At the same time, however, daylight may penetrate the panel 13 and make the markings visible, for daylight does contain the wave lengths that are reflected by the fluorescent markings 15.

The invention is not confined to the example above given. It just happens that the materials selected as the above example have a difference in the wave lengths of 60 millimicrons, but other materials may be selected having a greater or less difference in wave length, and such difference may be so small as to approach zero. Thus, the source of radiations may produce radiation up to 530 millimicrons, while the screen may pass radiations only above 530 millimicrons.

Obviously, it may be possible to select materials wherein the higher wave length is emitted by the source, to cause the activated material to produce shorter wave lengths, and the screen to pass wave lengths only shorter than those from the original source. Also, the boundary between the wave length of the source and those passed by the screen is not confined to that of the example, but may be almost anywhere within the range of light.

While the invention has been described more with relation to aircraft instruments, the principles may be applied to radio dials, automobile instrument panels, ship board instrument panels or in any desired installation where illumination other than that of dial fluorescent markings is detrimental.

Other modifications and changes in the proportions and arrangements of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

What is claimed is:

1. Instrument lighting means comprising a source of radiations whose wave length is within a certain range, a translucent panel in front of said source which screens out said certain range of radiations and fluorescent instrument markings behind said panel in a position to be activated by said source of radiations to emit radiations of a different range, said different range being within the range which said panel will transmit whereby substantially all said source radiations are screened out and only said instrument markings become visible through said panel.

2. Instrument lighting means comprising a source of radiations whose wave length is not greater than a certain number of millimicrons, a translucent panel which screens out radiations of a wave length less than said certain number of millimicrons, and fluorescent indicia markings in position to be activated by said source radiations to emit radiations at least greater than said certain number of millimicrons in wave length, said source of radiations and said instrument markings being on the side of the panel opposite from the side to be observed by the eye of the observer, whereby only said instrument markings become visible through said screening panel.

3. Instrument lighting means comprising a source of radiations whose wave length is not greater than 500 millimicrons, a colored translucent panel which screens out radiations of a wave length less than 560 millimicrons, and fluorescent instrument markings in position to be activated by said source radiations to emit radiations at least 560 millimicrons in wave length, said source of radiations and said instrument markings being on the side of the panel opposite from the side to be observed by the eye of the observer, whereby only said activated instrument markings become visible through said colored panel.

4. Instrument lighting means comprising a source of blue light, orange yellow fluorescent instrument markings so positioned as to be activated by radiations from said source of blue light, and a translucent red panel located to place the source of radiations and the activated instrument markings on the one side of the panel and the eyes of the observer on the other side of the panel to thereby screen out all radiations except those emitted by said activated instrument markings.

JOHN M. ROPER.
MAURICE K. LAUFER.

REFERENCES CITED

The following references are of record in the file of this patent:

UNITED STATES PATENTS

| Number | Name | Date |
|---|---|---|
| 1,760,253 | Parrish | May 27, 1930 |
| 1,871,552 | Padesky | Aug. 16, 1932 |
| 1,929,667 | Wilson | Oct. 10, 1933 |
| 2,251,984 | Cleaver et al. | Aug. 12, 1941 |
| 2,347,671 | Dircksen | May 2, 1944 |
| 2,392,979 | Douden | Jan. 15, 1946 |